Patented May 25, 1943

2,319,793

UNITED STATES PATENT OFFICE 2,319,793

ABRASIVES

Loring Coes, Jr., Brookfield, Mass., assignor to Norton Company, Worcester, Mass., a corporation of Massachusetts No Drawing. Application July 23, 1942, Serial No. 452,092

9 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde.

One object of the invention is to provide a superior plasticizer for abrasive grains for the manufacture of the foregoing type of abrasive composition. Another object of the invention is to provide an improved dry snagging wheel. Another object of the invention is to provide a grinding wheel or other solid abrasive article which, in various embodiments, may be substituted for abrasive articles bonded with shellac, rubber or phenol-formaldehyde, and which will remove a greater amount of metal for a given wheel wear.

Another object of the invention is to provide an ingredient for assisting the conversion of an aromatic amine-aldehyde resin, particularly aniline-formaldehyde, to the infusible condition. Another object of the invention is to provide a mixing plasticizer for abrasive grains having properties superior to furfural for the manufacture of the type of abrasive articles indicated. Another object of the invention is to provide a mixing plasticizer which does not react to form water.

Another object of the invention is to provide a wetting agent for carrying out the dry granular mix method in the manufacture of the type of abrasive articles indicated of superior quality. Another object is to avoid or prevent swelling of the abrasive article; to permit cold pressing and curing without pressure, and to avoid the formation of any water during the cure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —$CH_2$— groups to form a tough, heat resistant, semi-thermoplastic resin. I may add some of the formaldehyde after the initial condensation, in the form of paraformaldehyde, or by the addition of hexa-methylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1,2,diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the esters hereinafter described, the halogenated organic compound may be omitted altogether.

Since the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware). The furfural cross links the polymer and, therefore, converts it to the "infusible" condition. A stoichiometric quantity of aniline and formaldehyde condensed in the presence of a strong acid is believed to produce a resin which is structurally represented thus:

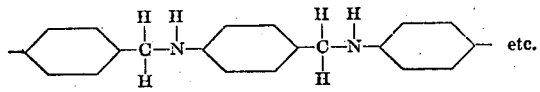

Such a resin cross-linked with furfural is believed to be represented thus:

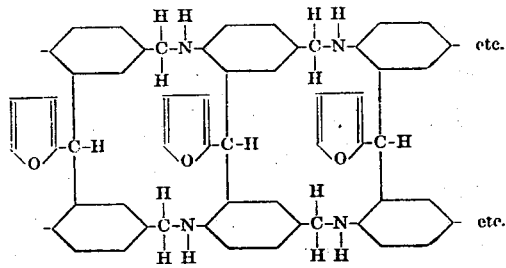

My invention consists in the use of esters of ethylene chlorhydrins with polybasic acids as the wettant-plasticizer for grinding wheels and other solid abrasive articles made out of abrasive grains bonded with aromatic-amine-aldehyde resin with or without the use of other halogenated compounds, with or without other fillers, and with or without the use of other wettant-plasticizers, such as furfural, but at present I prefer to use them alone. Thus, I may use di-2chlorethyl phthalate; this ester is:

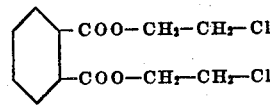

Or I may use di-2chlorethyl maleate; this ester is:

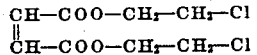

Or I may use di-2chlorethyl succinate; this ester is:

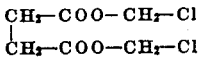

I believe the cross-linking thereby of the aniline-formaldehyde polymer is as shown by the following:

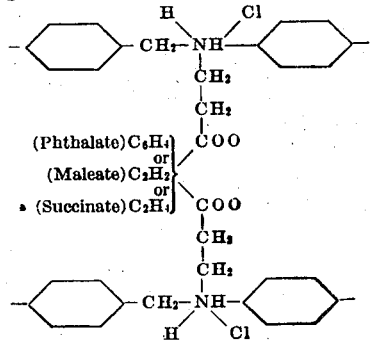

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

In the making up of abrasive wheels or other abrasive articles, according to my invention, I am enabled to achieve also other advantages; for example, the "green" wheel or other shape of abrasive body does not have to be pressed and heat-cured at the same time and on the contrary, after shaping it in any suitable way, it can be heat-treated for a suitable length of time, as in an oven, thus making it possible to avoid tying up expensive hot-press equipment. Moreover, abrasive wheels made according to my invention may be given, in general, the general characteristics of rubber-bonded wheels and thus may serve for grinding purposes where such characteristics are required or desired.

However, my invention also consists in the discovery that such esters as the above-mentioned ones function as good solvents or plasticizers or hardening agents for aromatic amine formaldehyde resins, with or without fillers, and thus articles other than abrasive bodies may be made, the final resin product being tough and of suitable hardness and lending itself, in its intermediate stage, that is, prior to heat treatment or prior to final curing, readily to molding or shaping into forms or configurations as desired. When used, however, in the making of abrasive bodies, I achieve a number of unique advantages and coactions, some of which are mentioned above and others of which are mentioned later hereinafter; thus, for example, these esters make available, in the final cross-linking with the above-mentioned polymer, of hydrogen chloride and moreover in a manner to bring about its liberation at the grinding line under the heat effect there present, as mentioned above.

Insofar as I am aware, these esters are also new compositions of matter and a preferred or illustrative method of deriving them may be as follows:

Thus, as to di-2chlorethyl phthalate, I may start with a mixture of 148 grams of phthalic anhydrite (1 mol) and 320 grams of ethylene chlorhydrine (4 mols) and heat it with 10 grams of p. toluene sulphonic acid; the latter I believe acts as a catalyst. The mixture is heated at such a rate, as in a flask provided with a short distillation column, that liquid is distilled at the rate of about 1 drop per 5 seconds. Heating is continued until the temperature in the boiling liquid rises to about 175° C. (about 8 hours). The mixture is then cooled, and is then neutralized with sodium carbonate, and washed with water, then dried, for example, over sodium sulphate. The ester so produced may be further purified as by distillation at reduced pressure, but I find it is sufficient merely to heat the product at 100° C. under a pressure of 20 millimeters until all traces of volatile impurities are removed, illustratively for a period of about 4 hours. The product is a slightly colored, heavy liquid and has a mild odor. It is a good solvent for aniline formaldehyde resins.

Di-2chlorethyl maleate and di-2chlorethyl succinate may be prepared in the same way and they too are good solvents for aniline formaldehyde.

In using them with aldehyde resins, with or without fillers or with or without abrasive grains, the following several examples as to the making of abrasive wheels will be illustrative:

Example I 525 grams of #46 grit "Alundum" abrasive grains are wet with 20 cc. of di-2chlorethyl phthalate, and here I find that the ester is a ready and good wettant for the grains; thereto I add 165 grams of a mixture, by volume, of 65% of an aniline formaldehyde resin, 30% of cryolite, and 5% of soluble anhydrite, and effect a good admixture or stirring thereof, thereby arriving at a so-called "dry granular mix." The mix is now spread in a 6" mold (where a grinding wheel is to be made), and pressed to a pore volume of 15 percent; this can be done cold or at room temperature. The "green" wheel is then stripped from the mold, and placed in an oven for heat treatment and curing. The initial curing temperature is about 95° C. and the temperature is raised gradually to about 175° C. over a period of 4 hours, and then kept at about that temperature for 2 hours, and then slowly cooled.

As to the other esters, the same procedure can be followed, using the same proportions of materials.

Example II 525 grams of #80 grit "Alundum" abrasive grains are wet with 25 cc. of di-2chlorethyl phthalate and thereto is added, with thorough stirring or mixing, 165 grams of a mixture, by volume, of 65% of an aniline formaldehyde resin, 30% of cryolite, and 5% of soluble anhydrite, resulting in a "dry granular mix." The latter is then worked on differential mixing rolls until a sheet is formed which is passed through calendar rolls to achieve the desired thickness, in this instance 1/4". Out of that sheet a 12" disk is cut and the disk is then placed in an oven and cured as described in the foregoing Example I.

As for the other esters, a similar procedure may be employed, using the same proportions of materials.

A wheel made according to Example II was tested on 3/4" cold rolled steel and it showed an areal wheel wear of 0.062 square inch per cut, running wet, and of 0.093 square inch per cut, running dry, indicating a range of durability like that of rubber-bonded wheels.

A wheel made according to Example I was tested as a portable snagging wheel with good results; its resiliency was of such an order as to greatly facilitate manual control of the positioning or movement of the wheel and the pressure of its application and gave the wheel a free cutting and smooth action.

According to certain prior practices, difficulties are encountered during heat treatment or curing, due to the fact that swelling occurs; such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

I make no claim herein to the resinous compositions or method of making the same or to the plasticizer or hardening agent inasmuch as such subject matter is disclosed and claimed in my co-pending application Serial No. 452,093, filed of even date herewith.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. The method of making a grinding wheel or other abrasive body comprising wetting abrasive grain with a grain-wettant and resin-hardening agent selected from the group consisting of di-2chlorethyl phthalate, di-2chlorethyl maleate and di-2chlorethyl succinate, mixing therewith amine formaldehyde resin and thereby producing a dry granular mix, and shaping and heat-treating the mix.

2. The method of making a grinding wheel or other abrasive body comprising wetting abrasive grain with a grain-wettant and resin-hardening agent selected from the group consisting of di-2chlorethyl phthalate, di-2chlorethyl maleate and di-2chlorethyl succinate, mixing therewith amine formaldehyde resin and thereby producing a dry granular mix, shaping the mix to the desired form, and then curing it at resin-curing temperature.

3. The method of making a grinding wheel or other abrasive body comprising wetting abrasive grain with a grain-wettant and resin-hardening agent selected from the group consisting of di-2chlorethyl phthalate, di-2chlorethyl maleate and di-2chlorethyl succinate, mixing therewith amine formaldehyde resin and thereby producing a dry granular mix, working the mix into sheet form of the desired thickness and cutting out of the latter the desired configuration or shape, and then heat-treating the latter at resin-curing temperature.

4. A grinding wheel or other abrasive body comprising abrasive grains bonded with the reaction product under heat treatment of amine formaldehyde resin and a grain-wetting and resin-hardening agent selected from the group consisting of di-2chlorethyl phthalate, di-2chlorethyl maleate, and di-2chlorethyl succinate.

5. A grinding wheel or other abrasive body comprising abrasive grains bonded with a bond that comprises the reaction product under heat treatment of a grain-wetting and resin-hardening agent selected from the group consisting of di-2chlorethyl phthalate, di-2chlorethyl maleate, and di-2chlorethyl succinate, which agent initially wets the grains and which is also a resin-hardening agent, and aniline formaldehyde resin.

6. The method of making an abrasive wheel or other abrasive body which comprises making a mix comprising abrasive grain and resin and a grain-wetting and resin-hardening agent selected from the group consisting of di-2chlorethyl phthalate, di-2chlorethyl maleate, and di-2chlorethyl succinate, and shaping and heat-treating the mix to harden the resin and bond the grain together.

7. The method of making an abrasive wheel or other abrasive body which comprises making a mix comprising abrasive grain and resin and a grain-wetting and resin-hardening agent selected from the group consisting of di-2chlorethyl phthalate, di-2chlorethyl maleate, and di-2chlorethyl succinate, shaping the mix to the desired conformation of the abrasive article and compacting it to the desired extent, and thereafter subjecting it to heat treatment for curing.

8. The method of making an abrasive wheel or other abrasive body which comprises making a mix comprising abrasive grain and resin and a grain-wetting and resin-hardening agent selected from the group consisting of di-2chlorethyl phthalate, di-2chlorethyl maleate, and di-2chlorethyl succinate, placing the mix in a mold to give it the desired conformation of abrasive article and while in the mold subjecting it to pressure to compact it to the desired extent, removing it from the mold and then heat-treating it to cure the resin.

9. The method of making an abrasive wheel or other abrasive body which comprises making a mix comprising abrasive grain and resin and a grain-wetting and resin-hardening agent selected from the group consisting of di-2chlorethyl phthalate, di-2chlorethyl maleate, and di-2chlorethyl succinate, working the mix into sheet form of the desired thickness, conforming it to the desired shape of abrasive article, and then heat-treating it to cure the resin and bond the abrasive grain together.

LORING COES, Jr.